Dec. 20, 1955     J. L. BOYER     2,727,936
TITANIUM FURNACE
Filed Nov. 23, 1954
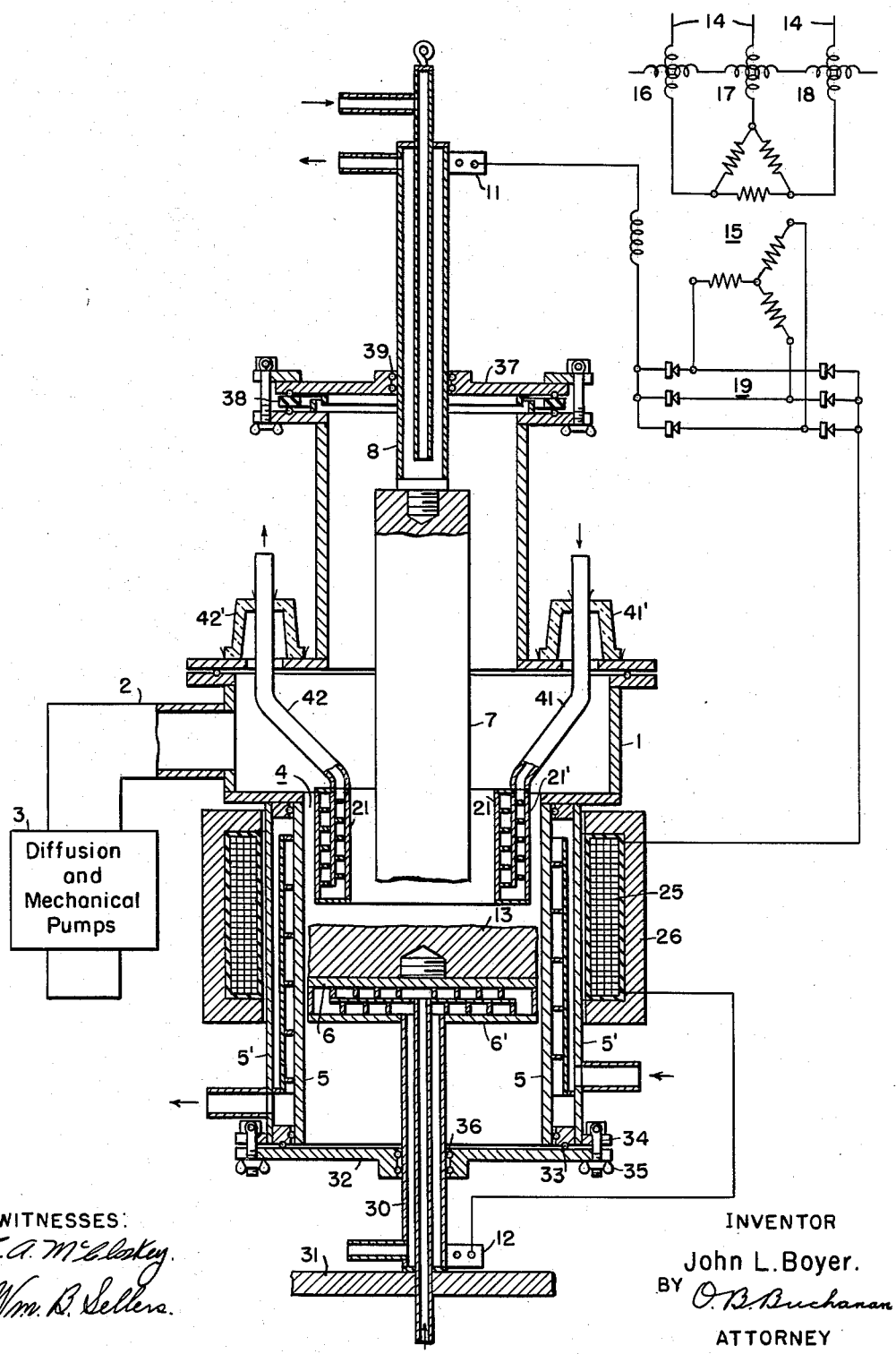
WITNESSES:
E. A. McCloskey
Wm. B. Sellers
INVENTOR
John L. Boyer.
BY O. B. Buchanan
ATTORNEY

United States Patent Office 2,727,936
Patented Dec. 20, 1955

2,727,936
TITANIUM FURNACE

John L. Boyer, Forest Hills, Pa., assignor to Westinghouse Electric Corporation, East Pittsburgh, Pa., a corporation of Pennsylvania Application November 23, 1954, Serial No. 470,680

4 Claims. (Cl. 13—31)

My invention relates to evacuated consumable-electrode electric-arc furnaces for the melting of solid electrodes of titanium or other high-melting-point chemically active metals and alloys.

In a previous patent-application, Serial No. 432,371, filed May 26, 1954, I have shown an evacuated arc-melting furnace using a non-consuming electrode, and feeding in the material which was to be melted, in the form of powdered material which was sprinkled on the arc. This furnace constituted a means for producing a solid bar which could be economically made in any desired length, depending only upon the height or length of the mold and the amount of powdered material which is melted in one molding operation.

My present invention consists of an improvement whereby the titanium or other material to be melted is supplied in the form of a consumable solid electrode, which may advantageously be a product of my previous powdered-electrode furnace. This necessitates the use of sufficient electric arc-energy to cause the consumable solid electrode to melt, plus the use of a suitable means for feeding down the electrode as it melts, in combination with the previously used means for continuously evacuating the furnace-chamber during the melting-process. This evacuating process serves to maintain a vacuum which is high enough to substantially prevent a chemical reaction between the molten electrode-material and the highly evacuated atmosphere within the enclosure, and to produce a very diffused arc, as pointed out in my previous application. The continuous evacuating means also serves to withdraw certain small undesirable lower-melting-point impurities, which are usually present, in small quantities, in the solid titanium electrode, so that each melting-process, in an evacuated furnace, serves as a refining process for increasing the purity of the titanium or other material which is melted in the furnace. Because of the diffused character of the arc, resulting from the high vacuum which is employed, it is necessary to provide a shielding-means for keeping an arc-terminal from forming on the side-walls of the melting pot, as described in my previous application.

With the foregoing and other objects in view, my invention consists in the systems, apparatus, structures, combinations, parts, and methods of design and operation, as hereinafter described, and as illustrated in the accompanying drawing, the single figure of which is a diagrammatic view of circuits and apparatus, using my present invention in an exemplary direct-current furnace, the furnace-structure being indicated by means of a somewhat diagrammatic vertical sectional view.

My furnace is an electric-arc furnace for melting electrically conducting material. The furnace comprises a substantially air-tight enclosure 1, which is provided with a pumping-connection 2 whereby the enclosure may be continuously evacuated, during the use of the furnace, as by means of diagrammatically indicated diffusion and mechanical pumps 3. The lower portion of the enclosure consists of a nonconsuming melting-pot 4, comprising side-walls 5 and a bottom-wall 6, so that the inner surfaces of these walls are within a lower portion of the evacuated enclosure.

Since the furnace is adapted to melt titanium, or other high-melting-point conducting material which is intensely active chemically, at temperatures approaching its melting point, so that it reacts chemically, at such temperatures, not only on air, but also on any insulating crucible-material which is known, it is necessary to make the melting-pot 4 out of water-cooled copper or other material which is a good conductor of both electricity and heat, so that the melting-pot material may be properly cooled. I prefer to make the side-walls 5 and the bottom-wall 6 of copper, and to cool the same by suitable means such as water-jackets 5' and 6', in accordance with a known practice in titanium furnaces.

My invention makes use of one or more consumable electrodes 7 of solid titanium, or other electrically conducting material to be melted. The top of this electrode 7 is carried by the bottom of an electrode-supporting piston or ram 8, which supports the electrode within the evacuated enclosure, in a position above and within the melting-pot 4. The electrode 7 thus has a cross-sectional area which is smaller than that of the melting-pot 4.

It is necessary to provide an electric power-supplying means, including a terminal 11 for the electrode 7, and a terminal 12 for the melting-pot 4, whereby an electric arc may be caused to play between the bottom of the consumable electrode 7 and the top of a melt 13 which is accumulating in the melting-pot 4 during the operation of the furnace, and enough electric energy must be put into this arc to produce enough heat to continuously melt away the bottom end of the consumable electrode 7. It is preferable that the consumable electrode 7 should be the anode or positive terminal of the arc, while the melt 13 is the cathode or negative terminal of the arc.

Any suitable electric-power means may be used for maintaining this melting-arc. In the illustrated form of embodiment of my invention, I use a three-phase power-supply 14, which energizes a step-down transformer 15 through any suitable power-regulating means such as the illustrated saturating reactors 16, 17 and 18. The secondary energy of the transformer 15 is rectified by means of the illustrated rectifiers 19, the positive and negative terminals of which are connected to the furnace-terminals 11 and 12, respectively.

As pointed out in my previous application, the high vacuum which is maintained by the pumping-means 3 causes a very diffused arc, which would spread out to the side-walls 5 of the melting-pot if means were not provided for properly shielding these side-walls 5. Usually, this will require a pressure of less than several millimeters of mercury, say 5 millimeters or less. No portion of the arc can be permitted to terminate on any part of the side-walls 5, because this would produce a hot spot, in spite of any water-cooling that could be used, and such a hot spot might melt through the side-wall 5, thus rendering the furnace inoperative.

As set forth in my above-mentioned previous application, I therefore provide a shielding means 21 for keeping an arc-terminal from forming on the side-walls 5 of the melting-pot 4. This shielding-means 21 is shown in the form of a cylindrical solid member 21, which is disposed inside of the upper portions of the side-walls 5 of the melting-pot 4, in spaced relation both to the side-walls 5 and to the upper surface of the melt 13. This cylindrical shielding-means 21 should preferably be made of a material, such as metal, which is a good conductor of both heat and electricity, and it is provided with a suitable cooling means, such as a water-jacket 21'.

Preferably, the shielding-means 21 includes a means for producing a substantially vertical magnetic field, surrounding the central portion of the top surface of the melt 13, in spaced relation to the peripheral portion of the melt. When the central arc starts to spread out so as to approach this annular magnetic field, the arc-stream is deflected by the field, so that the arc starts rotating, with the result that the arc cannot spread out past the field, thus protecting the side-walls 5 from becoming the seat of an arc-terminal.

Any suitable means may be provided for producing such an annular magnetic field. In the illustrated form of embodiment of the invention, the metallic shielding-means 21 is made of a magnetizable shield-material. The field-producing means may take the form of an external coil 25, which surrounds the water-jacket 5' of the side-walls 5, so as to extend above and below the level of the top surface of the melt 13. This coil 25 is preferably surrounded, on three sides, by a magnetizable external core 26, which causes a magnetic flux to flow downwardly throughout the vertical length of the magnetizable shield 21, and across the space from the bottom of the shield to the top of the melt 13 (or a reverse polarity of flux may be used).

The magnetizing coil 25 is preferably energized with unidirectional or direct current, by any suitable means. As illustrated, the coil 26 is connected in series with one of the leads which supplies direct or unidirectional current to the melting-arc within the furnace.

When this magnetic field is used as an arc-deflecting means, as shown, it is necessary, of course, that the side-walls 5 of the melting-pot 4, together with their cooling-jacket 5', shall be substantially non-magnetizable, at least in the region of the external magnet-core 26. It is usually convenient, to use non-magnetizable material, preferably copper, throughout the construction of the side-walls 5, the bottom wall 6, and the three water-jackets 5', 6' and 21'.

It frequently happens that the available supply of solid titanium, which is used as the consuming electrode 7, is not quite as pure as may sometimes be needed, because of the inclusion of a very small admixture of one or more unwanted impurities which, in general, have a lower melting-point than the titanium or other basic high-melting-point substance of the electrode 7. Thus, while the bottom end of the electrode 7 is being melted away by the heat of the electrical arc, the evacuating process which is continuously maintained by the pump 3 selectively draws off the vapors of these lower-melting-point impurities, thus leaving a considerably purified molten material 13 in the melting-pot 4.

It is necessary, as in other types of consumable-electrode arc-melting furnaces, to provide a vertical-adjustment means whereby, during the melting-operation, adjustments may be made with respect to the vertical distances between the bottom of the diminishing or consuming electrode 7 and the bottom of the shielding-means 21, and between the bottom of the said electrode 7 and the top of the accumulating melt 13 in the melting-pot 4, and between the bottom of the shielding-means 21 and the top of the accumulating melt 13. This is necessary, because the bottom of the shield 21 should have a close spacing with respect to the top of the melt 13, so as to facilitate in preventing the outward spreading of the arc across the peripheral portion of the top surface of the melt 13. It will be understood that various means can be used, as is known in the art, for maintaining the necessary spacing of the shield 21 above the top surface of the melt 13, either by holding the level of the arc substantially constant, or by allowing the top surface of the melt 13 to build upwardly, as the melt accumulates, and making the necessary adjustments in the positions of the parts which have to be properly vertically positioned relative to this top surface of the melt.

In the particular form of embodiment of my invention which is shown in the drawing, I have chosen to show a furnace in which the level of the top surface of the melt is held at a substantially constant level, by the proper vertical adjustment of the height of the bottom-wall 6 of the melting-pot 4. Thus, this bottom-wall 6 is supported by an ingot-supporting piston or ram 30, which extends downwardly and rests upon a vertically movable platform 31. The electrode-ram 7 and the ingot-ram 30 thus provide means whereby the necessary vertical distances or displacements may be adjusted, either by manual adjustments or by suitable automatic control (not shown), so that the electrode 7 may be lowered as it is consumed or melted away, and the bottom-wall 6 of the melting-pot 4 may also be lowered as the volume of the melt or ingot 13 builds up. Any one of various means (not shown) may be used to keep the operator advised of the levels of the electrode 7 and of the ingot or melt 13, or of the vertical position of the hot electric arc which plays between these two parts, so that the necessary vertical ram-adjustments may be made.

As in all furnaces, it is necessary to provide means whereby the product of the furnace may be removed, and whereby the furnace may be recharged for another operation. Since my furnace is in an evacuated enclosure 1, it is usually necessary or desirable to break the vacuum at the end of each melting-operation, after the metal or ingot 13 has cooled as much as may be necessary.

Thus, in the illustrated form of embodiment, underneath the side-walls 5 of the melting-pot 4, the air-tight enclosure 1 is provided with a removable bottom-plate 32, which is provided with an air-tight gasket 33, and which is held in place by hinged bolts 34 having wing-nuts 35. The ingot-ram 30 passes slidably through a suitably gasketed perforation 36 in the center of this bottom-plate 32. When it is time to remove the finished ingot or melt 13 from the melting-pot 4, the hinged bolts 34 are loosened, so that the ingot-supporting platform 31 can be lowered, together with the removable bottom-plate 32 of the enclosure, the bottom-wall 6 of the melting-pot 4, and the melt or ingot 13 which has accumulated on top of this bottom-wall 6, these parts being all lowered until the melt or ingot comes out of the bottom of the side-walls 5 of the melting-pot 4.

The top of the enclosure 1 is provided, in like manner, with a removable top-plate 37, which is insulated from the rest of the enclosure 1 by means of an insulating ring 38. The electrode-ram 8 passes slidably through a suitably gasketed perforation 39 in the center of this top-plate 37. Thus, at the end of a melting-operation of the furnace, the top-plate 37 can be removed, so that a new consumable electrode 7 can be secured to the bottom of the electrode-ram 8, to replace the one which had been melted off during the melting-operation of the furnace.

Suitable supporting-means must be provided, for holding the shielding-means 21 in its proper place, which has already been described. Preferably, as in the illustrated form of embodiment of my invention, the water inlet and outlet pipes 41 and 42, for the water-jacket 21' which cools this shield 21, serve as a supporting-means for the shield. It is quite desirable, so much so that it is almost, if not quite, obligatory, that the shield 21 shall be substantially electrically insulated from both the electrode 7 and the melting-pot 4. In the illustrated form of embodiment of my invention, the inlet and outlet water-pipes 41 and 42 of the shield 21 pass through insulators 41' and 42' which are supported on an intermediate portion of the enclosure 1. Thus, the shield 21 is insulated, by these insulators 41' and 42', from the enclosure 1 which is at the same potential as the melting-pot 4 and the ingot or melt 13. The electrode 7 is insulated from the enclosure 1 by the insulating ring 38 underneath the top-plate 37, so that the shield 21 is insulated from the electrode 7 by both the insulating ring 38 and the two insulators 41' and 42'. When I speak of the shield 21 being "substantially" electrically insulated from the electrode and from the melting-pot, I mean that the insulating-means does not permit the flow of enough current, in the shield, to support an arc which terminates on the shield.

While I have illustrated my invention in but a single preferred form of embodiment, which is submitted for illustrative purposes, I wish to emphasize that my invention is not limited to any precise structural form of embodiment, but is entitled to a considerable range of equivalents, in the substitution of equivalent parts and structures, in the addition of various refinements, safeguards, and all the other auxiliary parts, and possibly in the omission of certain parts or features which may not always be necessary.

I claim as my invention:

1. An electric-arc furnace for melting electrically conducting material, comprising a substantially air-tight enclosure, a melting-pot comprising side-walls and a bottom-wall having inner surfaces which are within a lower portion of said enclosure, said melting-pot being of a material which is a good conductor of heat and electricity, an electrode of solid electrically conducting material to be melted, and a means for supporting said electrode within said enclosure in a position above said melting-pot, said electrode-material consisting almost entirely of a high-melting-point substance which is quite active chemically at its melting-point, with a very small admixture of an unwanted impurity which includes a substance having a lower melting-point, the electrode having a cross-sectional area which is smaller than that of the melting-pot, terminal-means whereby an electric arc may be caused to play between the bottom of said electrode and the top of a melt which is accumulating in said melting-pot, with an arc-intensity which is sufficient to melt the electrode, a means for continuously evacuating said enclosure, during the melting-operation, so as to maintain a vacuum which is high enough to substantially prevent a chemical reaction between the molten electrode-material and the highly evacuated atmosphere within the enclosure, said vacuum being also high enough to produce a very diffused arc, said continuous evacuating means also serving to withdraw lower-melting-point impurities from the evacuated enclosure, a shielding-means for keeping an arc-terminal from forming on the side-walls of the melting-pot, means for continuously cooling the surfaces of the melting-pot and the shielding-means, during the melting-operation, to a temperature below that at which there is any substantial reaction with the material of the electrode and the melt, and means whereby, during the melting-operation, adjustments may be made with respect to the vertical distances between the bottom of the diminishing electrode and the bottom of the shielding-means, and between the bottom of the diminishing electrode and the top of the accumulating melt, and between the bottom of the shielding-means and the top of the accumulating melt, said enclosure having access-means whereby, after the completion of a melting-operation, access may be had for the removal of the melt and for the insertion of a new electrode.

2. The invention as defined in claim 1, characterized by the shielding-means being of a material which is a good conductor of heat and electricity, and being disposed so that it surrounds the sides of the electrode and so that it is substantially electrically insulated from the electrode and from the melting-pot.

3. The invention as defined in claim 1, characterized by the shielding-means including a means for producing a substantially vertical magnetic field surrounding the central portion of the top surface of the melt, in spaced relation to the peripheral portion of the melt.

4. The invention as defined in claim 1, characterized by the shielding-means including vertically disposed magnetizable shield-material which is also a good conductor of heat and electricity, and which surrounds the central portion of the top surface of the melt, in spaced relation to said top surface and to the peripheral portion of the melt, means for so supporting said magnetizable shield-material that it is substantially electrically insulated from the electrode and from the melting-pot, and a field-producing means for producing a substantially vertical magnetic field between the bottom of said magnetizable shield-material and the top surface of the melt, said field-producing means including magnetizable external core-material disposed outside of the enclosure, the material of the side-walls of the melting-pot, including its cooling-means, in the region of said external core material, being substantially non-magnetizable.

References Cited in the file of this patent

UNITED STATES PATENTS

| | | |
|---|---|---|
| 997,881 | Weintraub | July 11, 1911 |
| 2,541,764 | Herres et al. | Feb. 13, 1951 |
| 2,564,337 | Maddex | Aug. 14, 1951 |
| 2,640,860 | Herres | June 2, 1953 |
| 2,651,668 | Southern | Sept. 8, 1953 |
| 2,662,104 | Southern | Dec. 8, 1953 |
| 2,697,126 | Herres | Dec. 14, 1954 |